United States Patent Office 3,264,337
Patented August 2, 1966

3,264,337
ALKYLAMINOALKYL TRITHIOCARBONIC ACIDS
Rector P. Louthan, Bartlesville, Okla., assignor to Phillips Petroleum Company, a corporation of Delaware
No Drawing. Filed Oct. 12, 1962, Ser. No. 230,240
3 Claims. (Cl. 260—455)

This invention relates to alkylaminoalkyl trithiocarbonic acids. In one aspect this invention relates to a method for the preparation of alkylaminoalkyl trithiocarbonic acids.

It is an object of my invention to provide alkylaminoalkyl trithiocarbonic acids as a new composition of matter. Another object is to provide a process for the production of alkylaminoalkyl trithiocarbonic acids. These and other objects of the invention will be readily apparent to those skilled in the art from the following discussion and appended claims.

These objects are broadly accomplished by new and novel chemical compounds comprising alkylaminoalkyl trithiocarbonic acids having the structural formula

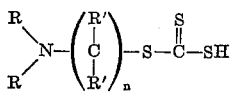

wherein each R is selected from the group consisting of alkyl and cycloalkyl radicals, said alkyl radicals containing from 1 to 10 carbon atoms, inclusive, and said cycloalkyl radicals containing from 3 to 10 carbon atoms, inclusive, each R' is selected from the group consisting of hydrogen, alkyl and cycloalkyl radicals containing from 1 to 10 carbon atoms, inclusive, $n$ is an integer from 1 to 10 inclusive, and wherein the total carbon atoms in said molecule does not exceed 30.

Preferably these compositions are prepared by reacting an alkylated amino-substituted thiol with carbon disulfide and recovering the product. Preferably the alkylated amino-substituted thiol is represented by the following structural formula

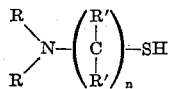

wherein R, R' and $n$ are defined as above for the alkylaminoalkyl trithiocarbonic acid.

These products have many potential uses as anti-radiation drugs, fungicides, and vulcanization accelerators.

In the practice of one embodiment of the invention the new composition is prepared by the rapid addition of carbon disulfide to an ice bath cooled slurry of the alkylated amino-substituted thiol reactant. The crystals which are formed in the reaction mixture readily precipitate and are separated by any suitable liquids-solids separation means.

Preferably the temperature of reaction is in the range of 0 to 100° C., more preferably 0 to 50° C., although temperatures above and below these figures produce the novel composition of this invention.

To assure complete reaction of the alkylated amino-substituted thiol, it is frequently advantageous to employ an excess of carbon disulfide although it is generally satisfactory to employ approximately one mole of carbon disulfide per mole of alkylated amino-substituted thiol. Ratios outside these ranges are also operable although high conversions to the desired product are not necessarily obtainable under conditions such as employing an excess of the thiol.

The alkylaminoalkyl trithiocarbonic acid products of this invention generally precipitate out of the reaction media as formed and can be recovered by simple filtration, decantation or the like. The products split out carbon disulfide readily and it is generally preferred not to attempt recrystallization of precipitated product. However, the initial precipitated product is of high purity and thus does not necessarily require a purification of this type.

The alkylated amino-substituted thiol reactant employed herein are known compounds and can be prepared by any suitable method. One such suitable method is described in the copending application, Serial No. 79,978, filed January 3, 1961, by R. P. Louthan, C. R. Bresson, and R. L. Cobb, now abandoned. In this method a salt of an amino-substituted ethylenically unsaturated compound is reacted with hydrogen sulfide in the presence of a free-radical catalyst such as ultraviolet radiation, and if desired, in the presence of an organic trialkylphosphite promoter.

Another suitable method for the preparation of the alkylamino-substituted thiol comprises reacting three moles of a dialkylamine, preferably a lower dialkylamine, having one hydrogen on the amino nitrogen with one mole of an acylthioalkyl halide, preferably an acylthio lower alkyl halide, in which the halogen is separated from the acylthiol group by at least 2 carbon atoms.

Specific examples of suitable alkylated amino-substituted thiol reactants employable for the preparation of the compositions of this invention include the following Dimethylaminomethanethiol
3-dimethylamino-1-propanethiol
2-dimethylaminoethanethiol
3-(N,N-di-n-butylamino)-1-butanethiol
5-N-isopropyl-N-methylamino-1-pentanethiol
6-(N,N-di-tert-butylamino)-2-hexanethiol
6-(N-n-pentyl-N-cyclohexylamino)-2,3,3,4,4,5,5,6-octamethyl-2-heptane thiol
10-(N,N-dimethylamino)-1-decanethiol
3-(N,N-di-n-decylamino)-2-cyclohexyl-1-propanethiol
5-(N,N-dicyclopentylamino)-3-cyclodecyl-1-pentanethiol and
8-(N-cyclooctyl-N-ethylamino)-5-cyclopentyl-3-tert-butyl-1-decanethiol Specific examples of the alkylaminoalkyl trithiocarbonic acids of this invention include the following Dimethylaminomethyl tritiocarbonic acid
2-dimethylaminoethyl trithiocarbonic acid
3-dimethylaminopropyl trithiocarbonic acid
4-diethylaminopentyl trithiocarbonic acid
5-(N,N-dicyclohexylamino)decyl trithiocarbonic acid
10-di-n-decylaminoonyl trithiocarbonic acid
3-(N-cyclopentyl-N-isopropylamino)-1, 1,2,2,3-pentamethylbutyl trithiocarbonic acid
8-di-n-octylaminooctyl trithiocarbonic acid
5-(N-methyl-N-tert-butylamino)heptyl trithiocarbonic acid
3-dicyclodecylaminopropyl trithiocarbonic acid and
4-dimethylamino-3-cyclohexylbutyl trithiocarbonic acid The solvents employed in my process comprise organic liquids that are chemically inert with respect to the reactants and have mutual solubility for the alkylated amino-substituted thiol and carbon disulfide employed but substantially none for the alkylaminoalkyl trithiocarbonic acids. Preferably they should have at least a limited solubility for water. In the practice of my invention I have preferred to employ alcohols having from 1 to 5 carbon atoms per molecule such as methanol, ethanol, isopropanol, butanol, and pentanol, although in some instances other liquids may be employed. In some instances it may be convenient to employ an excess of carbon disulfide as the reaction medium thus eliminating the use of extraneous solvent. The quantity of solvent employed should preferably be sufficient to provide a solution wherein the reactants are present in the range of 10 to 20 weight percent of the total. When employing an excess of carbon disulfide in lieu of extraneous solvent, the amount employed above that required to react will be in the same order. Alternative solvents include acetone, diethyl ether, aromatic hydrocarbons such as benzene or toluene and petroleum naphthas with a pressure sufficiently high that the reactants and diluents are maintained in the liquid phase, say about 25 lbs./sq. inch gauge or above. While operating in this manner cooling of the system to maintain the reaction mixture in the desired temperature range is effected by any suitable means such as an ice bath.

The following specific examples are intended to illustrate a suitable method for the preparation of the compounds of this invention. However, it is not intended to limit the invention to the specific compounds prepared herein.

*Example I*

3-dimethylaminopropyl trithiocarbonic acid was prepared by adding 14.2 gms. of carbon disulfide rapidly to an ice bath-cooled slurry of 22 gms. of 3-dimethylamino-1-propanethiol in 50 milliliters of water. The yellow crystals which formed in the reaction bath were filtered out and washed once with methanol and twice with ether. The washed product contained 29 gms. of material and had a melting point of 137–138° C. as determined in a sealed tube completely immersed in an oil bath. This compound easily lost carbon disulfide upon attempts to recrystallize it. An elemental analysis of material compared to the theoretical values for 3-dimethylaminopropyl trithiocarbonic acid was excellent as tabulated below:

ELEMENTAL ANALYSIS

| Element | Calculated for $C_6H_{13}NS_3$, Weight Percent | Found, Weight Percent |
|---|---|---|
| Carbon | 36.89 | 37.0 |
| Hydrogen | 6.71 | 6.9 |
| Nitrogen | 7.17 | 7.2 |
| Sulfur | 49.24 | 48.5 |

Infrared analysis further substantiated that the compound prepared was 3-dimethylaminopropyl trithiocarbonic acid.

*Example II*

2-dimethylaminoethanethiol was prepared by treating 50 gms. of 2-dimethylaminoethanethiol hydrochloride in 100 milliliters of water with 14.1 gms. of sodium hydroxide at room temperature. The reaction mixture was then cooled to 0° C. with an ice bath and 29.5 gms. of carbon disulfide was added. A precipitate containing 50.5 gms. of yellow crystalline solid having a melting point of 136–138° C. was obtained. Elemental analysis clearly indicated that this material was 2-dimethylaminoethyl trithiocarbonic acid as shown by the results following:

ELEMENTAL ANALYSIS

| Element | Calculated for $C_5H_{11}NS_3$, Weight Percent | Found, Weight Percent |
|---|---|---|
| Carbon | 33.12 | 33.7 |
| Hydrogen | 6.11 | 6.4 |
| Nitrogen | 7.72 | 7.8 |
| Sulfur | 53.05 | 52.1 |

As in Example I, infrared analysis substantiated that the compound was 2-dimethylaminoethyl trithiocarbonic acid.

While certain examples, structures and composition process steps have been discussed for purpose of illustration the invention is not limited to these. Variation and modification within the scope of the disclosure and the claims can readily be effected by those skilled in the art.

What I claim is:

1. A composition of a matter consisting essentially of an alkylaminoalkyl trithiocarbonic acid having the structural formula

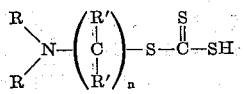

wherein each R is selected from the group consisting of alkyl and cycloalkyl radicals containing from 1 to 10 carbon atoms, inclusive, each R' is selected from the group consisting of hydrogen, alkyl and cycloalkyl radicals containing from 1 to 10 carbon atoms, inclusive, n is an integer from 1 to 10, inclusive, and wherein the total carbon atoms in said molecule does not exceed 30.

2. 3-dimethylaminopropyl trithiocarbonic acid.
3. 2-dimethylaminoethyl trithiocarbonic acid.

References Cited by the Examiner

UNITED STATES PATENTS

| | | | |
|---|---|---|---|
| 2,024,925 | 12/1935 | Hirschkind | 260—455 |
| 2,197,964 | 4/1940 | Bishop | 260—455 |
| 2,673,839 | 3/1954 | Kirshenbaum et al. | 260—455 |
| 2,840,502 | 6/1958 | Lambrech | 260—455 |

CHARLES B. PARKER, *Primary Examiner.*

D. D. HORWITZ, *Examiner.*

DALE R. MAHANAND, *Assistant Examiner.*